Patented Feb. 22, 1927.

1,618,822

UNITED STATES PATENT OFFICE.

MINER L. HARTMANN AND GEORGE J. EASTER, OF NIAGARA FALLS, NEW YORK, ASSIGNORS TO THE CARBORUNDUM COMPANY, OF NIAGARA FALLS, NEW YORK, A CORPORATION OF PENNSYLVANIA.

ADHESIVE AND METHOD OF USE.

No Drawing.    Application filed July 14, 1921.    Serial No. 484,762.

This invention relates to a new and improved process for the use of adhesive liquids to stick together porous or non-porous bodies. Its object is to secure the maximum adhesion between two bodies by bringing the adhesive liquid into intimate contact with their surfaces.

In certain industrial processes requiring the joining of two materials by means of an adhesive intermediary, it has long been the practice to apply the adhesive in the form of a viscous liquid. This liquid, with its low mobility and its low surface tension does not readily or thoroughly adhere to or "wet" the surfaces of the bodies to which it is applied. In order to secure the greatest amount of adhesion between two bodies, by the use between them of an adhesive material, it is essential that the latter cover completely the contact surface of each solid body, filling all crevices, pores and interstices. This condition is not completely attained by the methods commonly used in which thick, viscous liquid adhesives are applied.

Several methods which aim to obviate this difficulty are known, such as using a more dilute solution of adhesive, or by decreasing the viscosity of the liquid by use of elevated temperatures or by decrease of fluidity by certain adulterants or addition agents to the liquid adhesive material. All of these procedures have distinct disadvantages. The use of dilute solutions of adhesives either does not give a continuous bonding layer between the two bodies, due to irregularities of contact surfaces, or it does not give sufficient thickness of the adhesive to give the required strength. The use of elevated temperatures is often destructive to the fibre of the adhesive or of the solids which are desired to be stuck together. The use of adulterants or addition agents gives specific disadvantages.

We have discovered that the adhesion between a solid body and an adhesive agent (and consequently, the adhesion between two solids by means of a layer of adhesive agent between their surfaces) may be greatly increased by treating or coating the solid surfaces with an agent which has this specific property of increasing the surface tension and (or) increasing the fluidity of the adhesive in the liquid state, but which does not have a deleterious effect upon the adhesive material after it has "set" or solidified. Throughout the following discussion, this agent will be referred to as the "surface coating reagent".

As an illustration of the method of practicing our invention, its use in the manufacture of polishing wheels will be given. For this purpose, the usual method consists in coating the periphery of a flexible compressed fabric wheel first with a layer of thick viscous animal glue, then applying the loose abrasive grains (as for example, fused crystalline alumina grains) to the surface. After drying out, the wheel is ready for use as a flexible abrasive or polishing wheel. By our new and improved process, the abrasive grains are first treated in any suitable manner to produce a "surface coating". The "surface coating reagent" in this illustrative case may be composed of a thin layer of sodium fluoride, distributed evenly over the surface of abrasive grains. This may be accomplished by moistening the grains with a water solution of sodium fluoride, and evaporating off the excess water. When these coated abrasive particles are brought into contact with the surface of the viscous glue, the surface coating reagent dissolves in the glue solution, probably causing an increase in surface tension, thus increasing the tendency for the liquid glue to spread over the entire surface and into the cracks and crevices. At the same time, in this particular case, the fluidity of the adhesive material is also increased, allowing it to flow quickly and evenly over the contact surfaces. When the glue finally sets or dries out, the adhesive strength between glue and abrasive grains is markedly increased and the article consequently gives increased service.

Having thus described one illustrative application of our invention, we desire it to be understood that although specific terms are employed, they are used in a descriptive sense and not for purposes of limitation. In this illustrative application, we have described the use of the surface coating reagent in conjunction with the common agglutinate "glue", this term being used to include the commercial substances, known as animal glue, casein glue, blood albumin glue and vegetable glues. The process is equally applicable to the other materials which are used for adhesive purposes, for example, alkali silicates, rubber and rubber compounds, shellac, and shellac substitutes and numerous gums and resins.

For each of these agglutinates, there are surface coating reagents which cause improved adhesion of the liquid agglutinate and the surface of the solid, by an increase in fluidity and (or) an increase in surface tension of the liquid.

In the case of abrasive grains, such as fused alumina or silicon carbide, or garnet stuck together by means of animal glue, we have found that the bonding strength is increased markedly and in different amounts if the grains have previously been coated with reagents, as for example, sodium fluoride, boric acid, sodium sulphate, magnesium chloride, calcium chloride, iron sulphate, sodium silicate, sodium ammonium hydrogen phosphate, aluminum fluoride, or magnesium sulphate.

While we have postulated that the function of the surface coating reagent is to cause at the surface of contact an increase in the surface tension or in the fluidity of the liquid adhesive, or both, we do not restrict ourselves to reagents which do this, since this is given merely as the best explanation according to the present state of our knowledge of the phenomena.

We claim:

1. The step in the herein described process of joining bodies by means of a liquid non-metallic adhesive agent, which consists in coating the surfaces of said bodies intended to be stuck to each other or to other bodies with a substance having the specific effect upon the adhesive agent of increasing its tendency to flow and spread into intimate contact with the solid contact surfaces, and then mixing an adhesive agent with the bodies so covered.

2. The herein described process of joining bodies by means of a liquid non-metallic adhesive agent, comprising the steps of coating the surfaces of said bodies with a substance which increases the tendency of the adhesive agent to flow and spread into intimate contact with the solid contact surfaces, and thereafter applying the liquid adhesive agent.

3. The herein described process of joining or bonding fused crystalline aluminous abrasive grains by means of a liquid non-metallic adhesive agent, comprising the steps of first coating the surfaces of said grains with an inorganic salt which increases the tendency of the liquid adhesive agent to flow and spread into intimate contact with the surfaces of the abrasive grains, and thereafter applying a liquid adhesive agent.

4. The herein described process of joining or bonding fused crystalline aluminous abrasive grains, comprising the steps of coating the surfaces of said grains with a halogen salt, and thereafter applying a liquid glue to the coated grains.

5. The step in the herein described process of joining or bonding fused crystalline aluminous abrasive grains by means of a liquid non-metallic adhesive agent, which consists in coating the surfaces of said grains with an inorganic salt which has the specific effect upon the adhesive agent of increasing its tendency to flow and spread into intimate contact with the solid contact surfaces.

6. The step in the herein described process of joining or bonding crystalline abrasive materials by means of a liquid adhesive agent, which consists in coating the surfaces of said material with a halogen salt.

7. The step in the herein described process of joining or bonding fused crystalline aluminous abrasive grains by means of a liquid adhesive agent, which consists in coating the surfaces of said grains with sodium fluoride.

8. A granular material coated with a reagent having the specific effect of increasing the tendency to flow and spread into intimate surface contact of a liquid adhesive agent by which the said granular material is intended to be joined or bonded.

9. Fused aluminous abrasive grains coated with a halogen salt.

10. Fused aluminous abrasive grains coated with sodium fluoride.

11. A crystalline abrasive material coated with a reagent having the specific effect of increasing the tendency to flow and spread into intimate surface contact of a liquid adhesive agent by which the said material is to be joined or bonded.

12. The herein described process which consists in the deposition by evaporation of a surface layer of a substance on particles to be bonded, and then mixing a bonding substance with the particles so coated, the coating being of a substance different from the bonding material and being capable of causing the bonding material to spread intimately over the surface of the particles.

13. A bonded element of abrasive grains of improved strength wherein the bonding agent has been initially spread over the surface of the grains by an inorganic salt coated over the grains and subsequently incorporated into the binder.

In testimony whereof, we have hereunto set our hands.

MINER L. HARTMANN.
GEORGE J. EASTER.